United States Patent [19]

Hollifield et al.

[11] Patent Number: 4,834,596
[45] Date of Patent: May 30, 1989

[54] QUICK CHANGE SPINDLE ADAPTOR FOR TOOL HOLDER

[75] Inventors: Dean H. Hollifield; Frank R. Schultz, III, both of Mount Clemens, Mich.

[73] Assignee: T.M. Smith Tool International Corporation, Mount Clemens, Mich.

[21] Appl. No.: 124,035

[22] Filed: Nov. 23, 1987

[51] Int. Cl.$^4$ .................. B23B 31/04; B23Q 3/12
[52] U.S. Cl. .................... 409/232; 279/1 A;
  279/1 T; 279/7; 279/8; 279/101; 408/239 A;
  409/234
[58] Field of Search .............. 279/1 T, 1 B, 1 A, 8,
  279/91, 100, 101, 7, 99, 81, 89, 90, 1 N, 42, 48,
  52, 56, 1 Q; 409/231, 232, 234; 408/238, 239 R,
  239 A, 67, 57, 59

[56] References Cited

U.S. PATENT DOCUMENTS

| 329,545 | 11/1885 | Foley | 279/101 |
|---|---|---|---|
| 869,507 | 10/1907 | McAllister | 279/91 |
| 2,693,965 | 11/1954 | Briney, Jr. | 279/101 |
| 3,112,117 | 11/1963 | Wahlstrom et al. | 279/8 |
| 3,512,793 | 5/1970 | Botimer | 279/91 |
| 4,669,933 | 6/1987 | Dye | 409/234 |
| 4,710,079 | 12/1987 | Smith et al. | 409/234 |
| 4,722,645 | 2/1988 | Regan | 279/91 |

FOREIGN PATENT DOCUMENTS

| 2243904 | 3/1974 | Fed. Rep. of Germany | 408/67 |
|---|---|---|---|
| 22613 | 2/1983 | Japan | 408/199 |
| 30635 | 2/1984 | Japan | 279/91 |
| 127976 | 4/1950 | Sweden | 279/52 |
| 128003 | 6/1919 | United Kingdom | 279/91 |

Primary Examiner—Gil Weidenfeld
Assistant Examiner—Daniel W. Howell
Attorney, Agent, or Firm—Cullen, Sloman, Cantor, Grauer, Scott & Rutherford

[57] ABSTRACT

A quick change spindle adaptor for a power driven spindle having an axial bore and a tool holder having a shank axially projected into the spindle. A sleeve is secured upon the spindle and an outer shell is rotatably mounted upon the sleeve and retained thereon and includes a nut. A conical recess within the inner bore surface at the forward end of the spindle defines an axial bearing and receives a centering cone on the tool holder for maintaining an axial self alignment of the tool holder and spindle. Spaced threaded segments upon the tool holder are threadedly engaged by the nut for axially anchoring the tool holder upon the spindle and for biasing the centering cone into engagement with the spindle bearing.

21 Claims, 3 Drawing Sheets

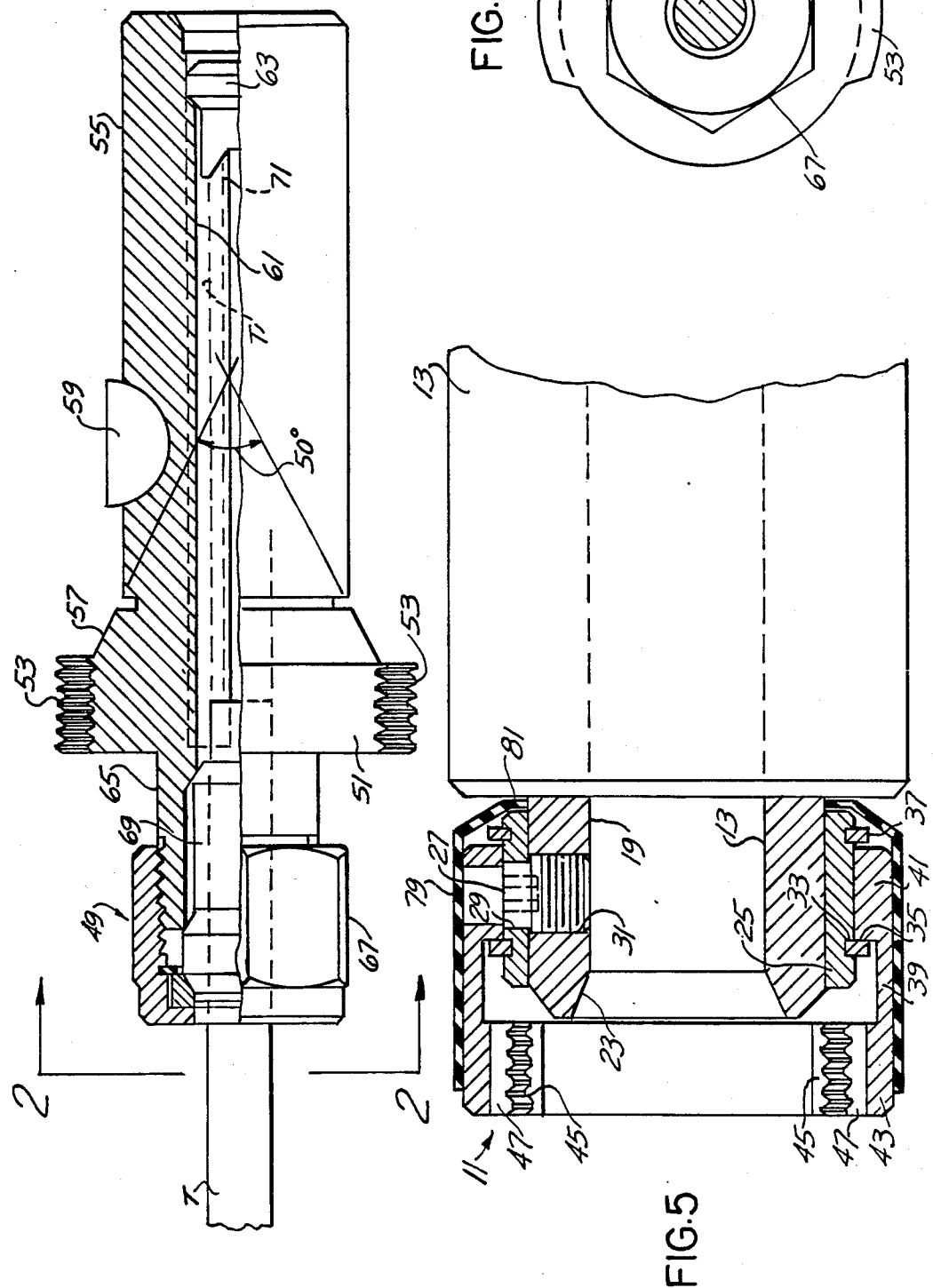

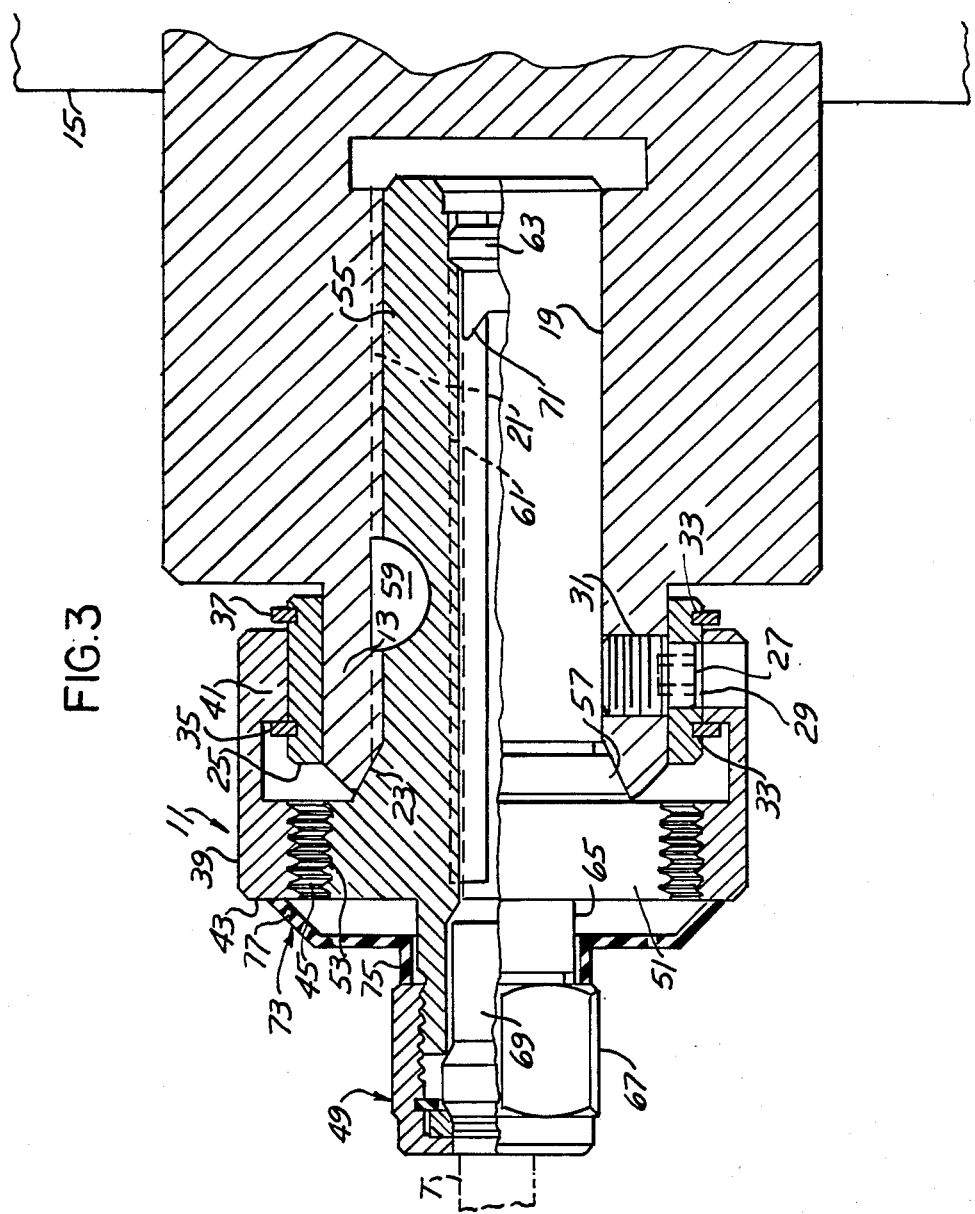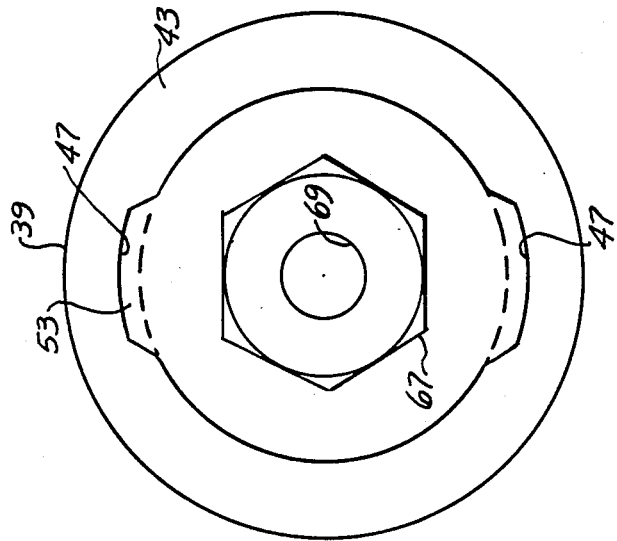

QUICK CHANGE SPINDLE ADAPTOR FOR TOOL HOLDER

FIELD OF THE INVENTION

The present invention relates to over spindle adaptors for quick change tooling on high volume multiple spindle machine tools.

RELATED PATENT APPLICATION

The present application is co-pending with application Ser. No. 943,825 filed Dec. 29, 1986 of Applicant's Assignee, entitled Quick Change Spindle Adaptor For Tool Holder, now U.S. Pat. No. 4,710,079, dated Dec. 1, 1987.

BACKGROUND OF THE INVENTION

Previously in the use of over the spindle adaptors for quick change tool holders such as set forth in the co-pending application there was employed a retractible spring biased sleeve mounted upon a body on a spindle having an internal taper engaging a series of balls mounted within the body extending from its opposite sides for operative retaining engagement with a tapered collar on the tool holder for operatively retaining the tool holder within and upon the spindle. In working with aluminum parts, the cuttings often got into and piled up within the ball assemblies and related parts.

With increased usage of aluminum castings and the boring into such castings with certain types of multiple spindle tools, the tools employed are approximately one-third the length of the tools previously used on multiple spindle drill heads or on single spindle applications.

There is a need for an improved quick change spindle adaptor wherein ball bearings are not needed to effectively anchor the tool holder within and upon the spindle and to axially bias the tool holder and the tool mounted thereon into the spindle.

SUMMARY OF THE INVENTION

An important feature of the present invention is to provide an improved quick change spindle adaptor for a tool holder assembly, wherein the ball bearings have been omitted and replaced by a fastening nut rotatably mounted and anchored upon the quick change spindle adaptor assembly for cooperative registry with a threaded means upon the tool holder. Such threaded means is operatively received and threadedly engaged by the nut upon the adaptor so as to axially secure the tool holder upon the spindle with the tool holder shank projected into the spindle bore and self-centered therein.

As an important feature the power rotated spindle includes an axial bore and at its forward end is adapted to receive the tool holder. A conical recess is formed within the inner bore surface at the forward end of the spindle defining a conical bearing adapted to receive a centering cone upon and around the tool holder. The centering cone is arranged forwardly of the tool holder shank and is in snug axial registry with said bearing for maintaining an axial self-alignment of the tool holder and spindle.

As still another feature a nut it rotatably mounted and anchored upon a sleeve secured to the spindle for limited rotary adjustment and adapted to threadedly receive the corresponding threaded member upon the tool holder forwardly of the centering cone thereon for axially anchoring the tool holder upon the spindle and for biasing the centering cone into continuous inward engagement within the spindle bearing.

As still another feature, a sleeve is mounted upon the spindle and secured thereto and over the sleeve is rotatably mounted an outer shell retained thereon against longitudinal movement and including a forwardly arranged internally threaded nut adapted to threadedly engage a corresponding threaded member upon the tool holder for axially anchoring the tool holder upon the spindle.

As another feature the internally threaded nut upon the outer shell includes a pair of 180° related axial windows or interruptions in the threads adapted to cooperatively receive a pair of opposed 180° related threaded segments upon the tool holder whereby a limited angular rotation of the nut relative to the threaded segments is adapted to axially anchor the tool holder upon the spindle and at the same time bias the centering cone into continuous inward engagement and nesting within the conical spindle bearing.

As still another feature, mounted upon the tool holder is an annular chip guard of a flexible material such as rubber having at one end an annular sleeve snugly engaging the tool holder and at its outer periphery a tapered flange in wiping and sealing registry with the nut on the outer shell for excluding chips, debris and lubricants from the interior of the nut, adaptor and the spindle.

As a further feature an additional flexible boot of rubber or equivalent material is snugly mounted around the outer shell and extends axially over exposed portions of the sleeve upon the spindle and includes a radial apertured flange at one end in sealing registry with the spindle for excluding chips, debris, and lubricants from the interior of the quick change adaptor, spindle and nut assembly.

As an important feature of the present invention the threaded means by which the adaptor is anchored to a tool holder may be employed to other tool holders mounting a tool and having a elongated shank projected into the bore of a power rotated spindle and keyed thereto, and wherein independent means are employed for centering the tool holder with respect to the spindle.

These and other objects and features will be seen from the following specification and claims in conjunction with the appended drawings.

THE DRAWINGS

FIG. 1 is an longitudinal section of a quick change tool holder with the tool mounted therein and fragmentarily shown.

FIG. 2 is a left end elevational view thereof.

FIG. 3 is a fragmentary longitudinal section of the quick change spindle adaptor and spindle with the tool holder of FIG. 1 on a reduced scale, assembled therein.

FIG. 4 is a left end view thereof.

FIG. 5 is a fragmentary longitudinal section of the present over the spindle adaptor, with the spindle having a conical bearing and partly broken away and sectioned.

Figure 6:
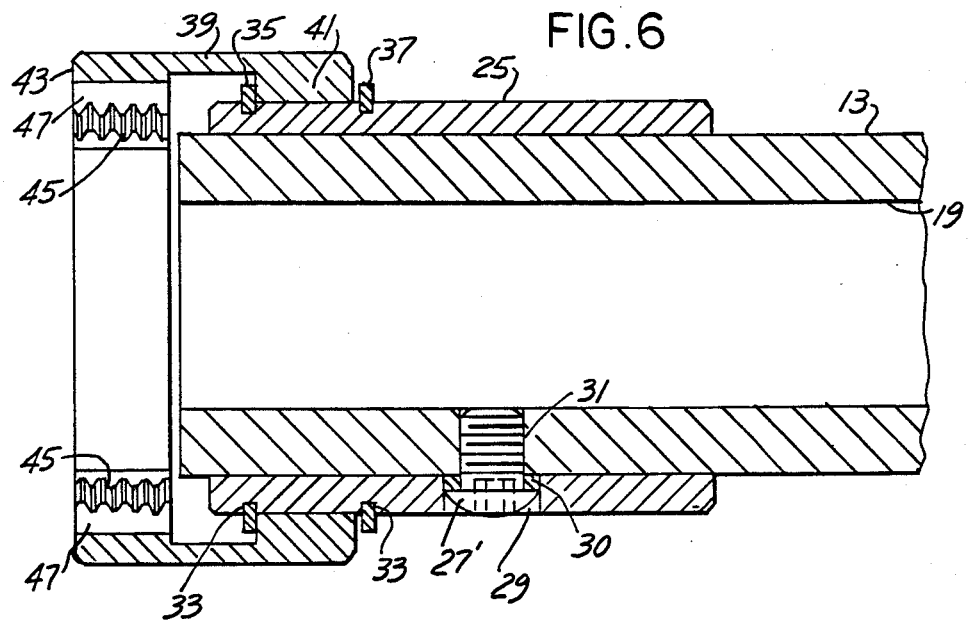
FIG. 6 is a similar view with present over the spindle adaptor mounted upon an elongated sleeve over the spindle, with the conical bearing omitted.

It will be understood that the above drawings illustrate merely preferred embodiments of the invention, and that other embodiments are contemplated within the scope of the claims hereafter set forth.

DETAILED DESCRIPTION OF AN EMBODIMENT OF THE INVENTION

Referring to the Drawings the present quick change spindle adaptor 11 for a tool holder assembly, FIG. 3, is used in conjunction with the power rotated spindle 13, fragmentarily shown, adapted for connection to a power rotated multiple spindle drill head 15 of a machine tool schematically shown. The present quick change spindle adaptor may be used upon a single power driven spindle, but in most systems is employed in conjunction with high volume multiple spindle machine tools.

Spindle 13 has a forward end of a reduced diameter and a longitudinal bore 19 adapted to receive tool holder 49, FIG. 1. Said spindle has a longitudinal keyway 21 therein adapted to receive a Woodruff Key 59 or other key normally mounted upon the tool holder.

The spindle 13 sometimes referred to as having a forward end includes a conical recess 23 within its inner bore surface at its forward end defining a conical bearing. The conical recess 23 opens forwardly and outwardly. The included angle between opposite sides of the conical bearing, FIG. 3, is 50°, approximately, in the illustrative embodiment.

Sleeve 25 is mounted over spindle 13 at its forward end and is secured in position by the radial set screw 27. Said set screw extends through a radial aperture 29 in sleeve 25 and is threaded at 31 into spindle 13, FIGS. 3 and 5.

In the modification shown in FIG. 6, the set screw 27' has a button head adapted to operatively engage the normally convex thrust washer 30 within sleeve 25 and bearing against spindle 13. The button head is held in compression to more firmly retain said sleeve.

A pair of annular grooves 33 are formed within sleeve 25 adapted to receive locking rings 35 and 37, FIGS. 3 and 6. Annular outer shell 39 is rotatively positioned upon sleeve 25 and includes an internal annular flange 41 in engagement with said sleeve. Said flange upon its opposite sides is retainingly engaged by the lock rings or snap rings 35 and 37. This provides a means of rotatably mounting the outer shell 39 upon sleeve 25 and restraining said sleeve against relative longitudinal movements.

The forward end of the outer shell 39 terminates in the nut 43 which is interiorly threaded at 45 throughout 360°, with the exception of a pair of 180° axial windows 47 therein FIG. 4.

QUICK CHANGE TOOL HOLDER ASSEMBLY

The present tool holder assembly is generally indicated at 49, FIGS. 1 and 3, sometimes referred to as a true tapered collet chuck holder assembly for supportively mounting the tool T which may be a drill, a reamer or a counter boring tool, fragmentarily shown in FIG. 1. The tool holder assembly includes annular body 51 intermediate its ends upon which are arranged a pair of opposed 180° related thread segments 53, FIGS. 1 and 2. Thread segments 53 are adapted for registry within nut windows 47 and with the interior threads 45 of nut 43, FIG. 3. In such assembly as the tool holder 49 is assembled into the bore of spindle 13 the corresponding opposed thread segments 53 are axially projected into and through the axial windows 47 in nut 43 which is a part of outer shell 39.

Tool holder 49 includes an elongated cylindrical shank 55 which extends to one end thereof and is adapted for a sliding projection into the forward end of the corresponding bore 19 of the spindle. Annular centering cone 57 is formed upon the tool holder forwardly of shank 55 and adjacent the annular body 51 and thread segments 53. The centering cone surfaces define an included angle of 50°, approximately, corresponding to the included angle between the corresponding opposed walls of conical recess 23 formed in the forward end of spindle 13. Centering cone 57 is complimental to conical recess 23 and adapted for cooperative snug nesting and axial assembly thereinto, FIG. 3.

In the basic assembly using the conical bearing surface 23 and the centering cone 57, said cone is designed to seat solidly against the spindle face. The independant movement of the lock in cone 57 permits proper clamping on the center line of the spindle utilizing the present quick change spindle adapter and including the nut 43.

The positive drive assembly 63 is threaded into the bore 61 and is adapted to operatively engage the tang 71 upon the inner end of tool T for a driving relation therebetween. By longitudinally adjusting the positive drive assembly 63 relative to bore 61 the extension of tool T from the outer end of the tool holder may be adjusted.

The body extension 65 of the tool holder 49 is exteriorly threaded. There is mounted thereon a conventional threaded nose piece 67 which mounts a conventional split collet assembly 69 adapted to axially grip the tool T, fragmentarily shown which may be a drill, a counter boring tool, a reamer or other tool. Such tool is normally arranged upon the longitudinal axis of tool holder 49 and secured therein upon the tightening of nose piece 67 in an conventional manner. Its description is not repeated herein.

As shown in FIG. 3 a chip guard 73 of flexible material such as rubber includes an annular mount sleeve 75 which surrounds the tool holder body extension 65. Portions of the chip guard extend radially outward and terminate in the tapered annular flange 77 in operative wiping and sealing engagement with the outer shell and nut assembly 39. The chip guard serves to exclude chips, debris and lubricants from the interior of the nut assembly, spindle and spindle adaptor.

The protective boot 79 of cylindrical shape, FIG. 5, is mounted around outer shell 39 and is constructed of flexible material such as rubber. The boot extends over an exposed portion of sleeve 25 and includes radial wall 81 apertured to cooperatively register with the forward end of spindle 13. Boot 79 protectively seals and encloses outer shell 39, sleeve 25 and the spindle to exclude chips, debris and lubricant from the interior of the quick change adaptor, from the nut assembly and from the spindle.

Figure 7:
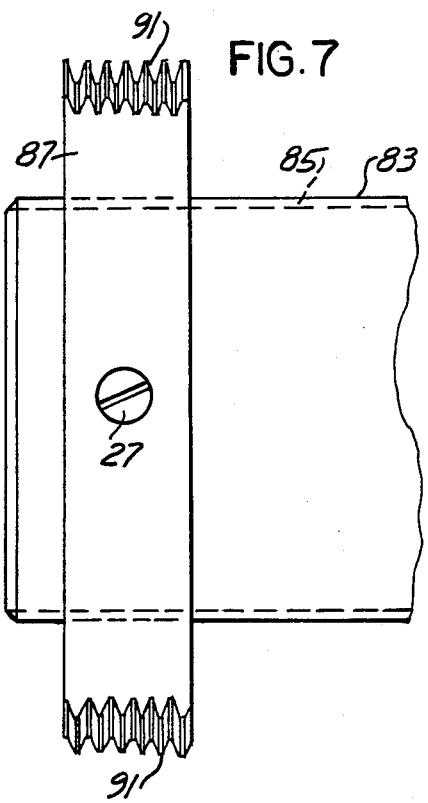
FIG. 7 is a side elevational view of the threaded shaft of a tool holder, fragmentarily shown, of general construction, having threaded segments adapted for use with the present over the spindle quick change adaptor shown in FIG. 6, on an increased scale.
Figure 8:
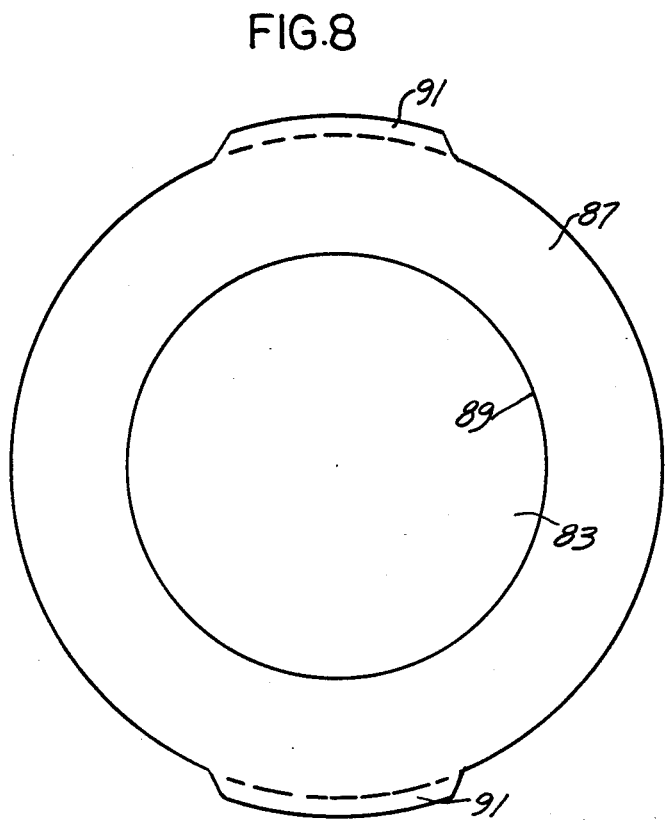
FIG. 8 is an end view thereof.

In the modification shown in FIGS. 7 and 8 there is shown a tool holder shaft 83 of general construction which is exteriorly threaded at 85 over which a nut 87, internally threaded at 89, is threaded, and secured as by a set screw 27 and includes a pair of 180° related thread segments 91 adapted for use in conjunction with the adaptor assembly of FIG. 6.

The quick change spindle adapter, shown in FIG. 6, is substantially the same as above described with respect to FIG. 5 except that the sleeve 25 has been elongated.

The spindle element 13 receiving sleeve 25 is longer. There is the longitudinal bore 19 axially of spindle 13 to receive a tool holder. There is no centering cone as shown at 23 in FIG. 5. The spindle adapter assembly 39, 25 shown in FIG. 6 may be used with other types of tool holders which have different means for effecting an alignment between the tool holder and the spindle.

All that is required is that the tool holder shank 83 in FIGS. 7 and 8 is exteriorly threaded at 85 to receive the nut 87 having the threaded bore 89, secured in position upon the shaft 83 by set screw 27. The adapter assembly including outer shell 39 and nut 43, 45 retained on sleeve 25 cooperatively receives the pair of opposed thread segments 91 upon nut 87 in the same manner as above described relative to FIGS. 3, 4 and 5. Here also the corresponding thread segments 91 are initially assembled axially into the corresponding windows 47 of the nut 43 upon the quick change adapter outer shell 39 and thereafter the nut 45 is rotated a limited distance as for example up to 90° more or less, or such sufficient angle as to fixedly anchor the tool holder to the spindle.

This is effective for securing the tool in holder and tool axial alignment within and upon the power rotated spindle.

With the present quick change spindle adapter changes in tooling will take five (5) seconds as compared to standard methods taking up to two (2) minutes. Having described our invention, reference should now be had to the following claims.

We claim:

1. A tool holder and quick change spindle adaptor for a power driven spindle having an axial bore and a forward end;
   a tool holder having a shank at its inner end axially projected into and keyed to said spindle;
   a sleeve mounted upon the spindle;
   means to secure the sleeve on the spindle;
   an outer shell rotatably mounted upon said sleeve;
   means to retain the shell against longitudinal movement;
   an interiorly threaded nut upon said shell arranged forwardly of said spindle;
   a conical recess within the inner bore surface at the forward end of said spindle defining an axial bearing;
   a centering cone on and around said tool holder intermediate its ends and forwardly of said shank in snug operative and axial registry with said axial bearing for maintaining an axial self alignment of said tool holder and spindle; and
   threaded means upon said tool holder forwardly of said centering cone, threadedly engaged by said nut for axially anchoring said tool holder upon said spindle and for biasing said centering cone into continuous inward engagement and nesting within said spindle bearing.

2. In the quick change spindle adaptor of claim 1,
   the securing means for said sleeve including a radial set screw extending through said sleeve and threaded into said spindle.

3. In the spindle adaptor of claim 2,
   said set screw having a button head; and
   a normally convex washer within said sleeve bearing against said spindle and receiving said button head in compression.

4. In the quick change spindle adaptor of claim 3,
   there being a radial bore in said outer shell for access to said set screw.

5. In the quick change spindle adaptor of claim 1,
   the retaining means for said outer shell including a pair of spaced snap rings anchored within annular channels in said sleeve retainingly engaging inner and outer portions of said outer shell.

6. In the quick change spindle adaptor of claim 1,
   said outer shell having an internal annular mount flange bearing against said sleeve;
   the retaining means for said shell including a pair of spaced snap rings anchored within annular channels in said sleeve retainingly engaging opposite sides of said mount flange.

7. In the quick change spindle adaptor of claim 1,
   said threaded means including an annular body upon said tool holder forwardly of said centering cone; and
   a pair of threaded segments upon said body spaced apart by 180° threadedly received by said nut.

8. In the quick change spindle adaptor of claim 7,
   said nut having a pair of axial windows spaced apart by 180° to axially receive said threaded segments.

9. In the quick change spindle adaptor of claim 1,
   an annular chip guard of flexible material having a sleeve mounted upon and surrounding said tool holder and including an enlarged tapered annular flange engaging said nut for excluding chips, debris and lubricants from the interior of said nut, adaptor and spindle.

10. In the quick change spindle adaptor of claim 1,
    and an annular boot of flexible material mounted over said outer shell and, over said sleeve and having an annular flange engaging said spindle for excluding chips, debris and lubricants from the interior of said nut, adaptor and spindle.

11. In a spindle adaptor and tool holder assembly including a power rotated spindle having a bore and a forward end adapted to receive a tool holder, a sleeve mounted upon the spindle, means to secure the sleeve on the spindle, the tool holder assembly including a tool holder mounting a tool and having a shank at its inner end slidably projected into the spindle bore and keyed to said spindle;
    the improvement comprising a conical recess within the inner bore surface at the forward end of said spindle defining a conical bearing;
    a centering cone upon and around said tool holder forwardly of said shank, in snug and axial registry with said bearing, maintaining an axial self-alignment of said tool holder and spindle;
    an outer shell rotatably mounted upon said sleeve;
    means to retain the shell against longitudinal movement; an internally threaded nut upon said shell arranged forwardly of said spindle; and
    threaded means upon said tool holder forwardly of said centering cone threadedly engaged by said nut for axially anchoring said tool holder upon said spindle and for biasing said centering cone into continuous inward engagement and nesting within said spindle bearing.

12. In the spindle adaptor of claim 2,
    the securing means for said sleeve including a radial set screw extending through said sleeve and threaded into said spindle.

13. In the spindle adaptor of claim 12,
    there being a radial bore in said outer shell for access to said set screw.

14. In the spindle adaptor of claim 2, the retaining means for said shell including a pair of spaced snap rings anchored within annular channels in said sleeve retainingly engaging inner and outer portions of said shell.

15. In the spindle adaptor of claim 2,
said outer shell having an internal annular mount flange bearing against said sleeve;
the retaining means for said shell including a pair of spaced snap rings anchored within annular channels in said sleeve retainingly engaging opposite sides of said mount flange.

16. In the spindle adaptor of claim 2,
said threaded means including an annular body upon said tool holder forwardly of said centering cone; and
a pair of threaded segments upon said body spaced apart by 180° threadedly received by said nut.

17. In the spindle adaptor of claim 16,
said nut having a pair of axial windows spaced apart by 180° to axially receive said threaded segments.

18. In the spindle adaptor of claim 11,
an annular chip guard of flexible material having a sleeve mounted upon and surrounding said tool holder and including an enlarged tapered annular flange engaging said nut for excluding chips, debris and lubricants from the interior of said nut, adaptor and spindle.

19. In the quick change spindle adaptor of claim 11,
and an annular boot of flexible material mounted over said outer shell and, over said sleeve and having an annular flange engaging said spindle for excluding chips, debris and lubricants from the interior of said nut, adaptor and spindle.

20. A tool holder and quick change spindle adaptor for a power driven spindle having an axial bore and a forward end;
a tool holder having a shank at its inner end axially projected into and keyed to said spindle;
a sleeve mounted upon the spindle;
means to secure the sleeve on the spindle;
an outer shell rotatably mounted upon said sleeve;
means to retain the shell against longitudinal movement;
an interiorly threaded nut upon said shell arranged forwardly of said spindle;
cooperating means on said spindle and tool holder for maintaining an axial self alignment of said tool and spindle; and
threaded means upon said tool holder threadedly engaged by said nut on rotation thereof for axially anchoring said tool holder upon said spindle.

21. In a spindle adaptor and tool holder assembly including a power rotated spindle having a bore and a forward end adapted to receive a tool holder, and a sleeve mounted upon the spindle and means to secure the sleeve on the spindle;
the tool holder assembly including tool holder mounting a tool and having a shank at its inner end slidably projected into the spindle bore and keyed to said spindle;
cooperating means on said spindle and tool holder for maintaining an axially self alignment of said tool holder and spindle;
the improvement comprising an outer shell rotatably mounted upon said sleeve;
means to retain the shell against longitudinal movement;
an internally threaded nut upon said shell arranged forwardly of said spindle; and
threaded means upon said tool holder engaged by said nut for axially anchoring said tool holder upon said spindle.

* * * * *

UNITED STATES PATENT AND TRADEMARK OFFICE
CERTIFICATE OF CORRECTION

PATENT NO. : 4,834,596
DATED : May 30, 1989
INVENTOR(S) : H. Dean Hollifield and Frank R. Schultz, III It is certified that error appears in the above-identified patent and that said Letters Patent is hereby corrected as shown below:

Coumns 6 and 7

In claims 12, 14, 15 and 16, line 1, the numeral 2 should read "11".

Signed and Sealed this

Seventeenth Day of December, 1991

Attest:

HARRY F. MANBECK, JR.

Attesting Officer

Commissioner of Patents and Trademarks